Jan. 7, 1964    B. T. BROWN ETAL    3,117,095
PROCESS FOR THE REGENERATION OF A SOLID ADSORBENT
Filed Dec. 19, 1960

INVENTORS
B.T. BROWN
R.F. DYE
J.Q. WOOD

BY Hudson & Young
ATTORNEYS

United States Patent Office 3,117,095
Patented Jan. 7, 1964

3,117,095
PROCESS FOR THE REGENERATION OF A SOLID ADSORBENT
Byron T. Brown, Robert F. Dye, and James Q. Wood, Bartlesville, Okla., assignors to Phillips Petroleum Company, a corporation of Delaware
Filed Dec. 19, 1960, Ser. No. 76,894
11 Claims. (Cl. 252—414)

This invention relates to the regeneration of a solid adsorbent. In one aspect this invention relates to the regeneration of a solid desiccant deactivated by the dehydration of a hydrocarbon.

It is frequently desirable and many times necessary to remove moisture and other impurities from gases and liquids. For example, it may be necessary to remove the last traces of moisture from certain organic substances, such as gasolines, alcohols, esters, and polymerizable hydrocarbons, to forestall adverse effects, such as corrosion. It has also been found that it is frequently necessary to remove the last traces of moisture from reactants used in a catalytic reaction to forestall inactivation of the catalyst.

It is known that adsorbent materials such as bauxite, activated alumina, silica gel, and the like have desiccating properties and that such materials may be reactivated and reused. Fluids to be dehydrated are passed through beds of these granular adsorbents to attain a degree of water removal depending upon their drying efficiency at the particular operating conditions.

Adsorbents generally have a limited capacity for water and require reactivation or regeneration which involves removing the adsorbed water and other adsorbed contaminants. In accordance with conventional practice, solid adsorbents or desiccants which have become substantially inactive due to hydration are regenerated by heating with hot dry gases which extract the water as water vapor. The exhausted extracting gases are either wasted or cooled below their dew point to condense the water vapor therein and reused by again heating to the required regeneration temperature and again passing into contact with the solid desiccant. This cycle of operation is carried out continuously until the desired degree of desiccant dehydration is obtained.

When the fluid to be dehydrated is a polymerizable hydrocarbon it has heretofore been the practice to regenerate the deactivated adsorbent bed by first flushing out the remaining polymerizable hydrocarbon with a fluid, such as sweet gas, then reactivating said beds by contact with a hot regenerative gas other than the gas used for flushing and then cooling said beds by contact with the same fluid used for reactivation at a lower temperature. However, the fluids heretofore proposed have not proved entirely satisfactory since they frequently fail to remove the residual polymerizable hydrocarbon which is then polymerized when the temperature of the bed is elevated during the regeneration step.

It is an object of this invention to provide an improved method for regenerating a solid adsorbent.

It is another object of this invention to provide a novel method for regenerating a solid desiccant which has become deactivated for dehydrating a fluid containing moisture.

It is still a further object of this invention to provide a process for the regeneration of a solid desiccant which has become deactivated for the dehydration of a polymerizable hydrocarbon.

Other objects and advantages of this invention will become apparent to those skilled in the art from the accompanying description, drawing and claims.

These objects are broadly accomplished by a process for the regeneration of an adsorbent deactivated by the dehydration of a hydrocarbon comprising contacting said adsorbent with a liquid hydrocarbon diluent inert to said hydrocarbon, thereafter contacting said adsorbent with said diluent in a superheated and vaporized state and thereafter contacting said adsorbent with said liquid diluent to cool said adsorbent.

In one aspect of this invention the diluent used in the regeneration of said adsorbent deactivated by dehydrating hydrocarbons comprises the same diluent used in a process for the polymerization of a polymerizable hydrocarbon.

In another aspect of this invention the adsorbent used in dehydrating the diluent used in the subsequent process is regenerated by contacting said adsorbent with said diluent in a superheated and vaporized state and thereafter contacting said adsorbent with said liquid diluent to cool said adsorbent.

In a preferred embodiment the adsorbent is used for dehydrating a conjugated diene subsequently used in a process comprising the polymerization of said conjugated diene in the presence of a catalyst and a liquid diluent to form a rubbery polymer.

The term "rubbery polymer" includes elastomeric, vulcanizable polymeric material which after vulcanization, i.e. cross-linking, possesses the properties normally associated with vulcanized rubber, including materials which when compounded and cured exhibit the reversible extensibility at 80° F. of over 100 percent of a specimen's original length with a retraction of at least 90 percent within one minute after release of the stress necessary to elongate 100 percent.

Preferably the monomeric material polymerized to produce rubbery polymers by this process comprises conjugated dienes containing from 4 to 8, inclusive, carbon atoms. Examples of conjugated dienes which can be used include 1,3-butadiene, 2-methyl-1,3-butadiene (isoprene), 2,3-dimethyl-1,3-butadiene, 2-methyl-1,3-pentadiene, chloroprene, 1-cyanobutadiene, 2,3-dimethyl-1,3-pentadiene, 2-methyl-3-ethyl-1,3-pentadiene, 2-methoxybutadiene, and the like.

In a preferred process, isoprene is polymerized in the presence of a catalyst to be described to form cis-1,4-polyisoprene having a chemical structure substantially the same as that of natural rubber. In another preferred process, 1,3-butadiene is polymerized in the presence of one of the catalyst systems herein described to form polybutadiene in which an excess of 90 percent of the polymer is formed by 1,4-addition of butadiene.

This invention is applicable to the polymerization of the above-defined conjugated dienes either alone or in admixture with each other and/or with, in minor amounts, one or more other compounds containing an active $CH_2\!=\!C\!<$ group which are copolymerizable therewith. Included among these latter compounds are aliphatic 1-olefins having up to and including 8 carbon atoms per molecule, such as ethylene, propylene, 1-butene, 1-hexene, and 1-octene. Branched chain olefins, such as isobutylene, can be used as well as 1,1-dialkyl-substituted and 1,2-dialkyl-substituted ethylenes such as butene-2, penetene-2, hexene-2, heptene-2, 2-methylbutene-1, 2-methylhexene-1, 2-ethylheptene-1, and the like. Other olefins which can be used include di- and polyolefins, such as 1,5-hexadiene, 1-4-pentadiene and 1,4,7-octatriene, and cyclic olefins, such as cyclohexene. Other examples of compounds containing an active $CH_2\!=\!C\!<$ group which are copolymerizable with one or more of the conjugated dienes are styrene, divinyl benzene, 3-vinyl toluene, 1-vinyl naphthalene, 3-methyl styrene, acrylonitrile, methacrylonitrile, methyl acrylate, methyl methacrylate, vinyl acetate, vinyl chloride, 2-methyl-5-vinylpyridine, 2-vinylpyridine, 4-vinylpyridine and the like.

The catalyst systems which are used in the aforementioned process for the polymerization of conjugated dienes include those which contain as an essential component a compound selected from the group consisting of organo metals or metal hydrides, the metals being one of groups I, II, or III of the periodic table. Such catalyst systems include (a) a hydride or organo compound of one of the metals aluminum, gallium, indium, thallium and beryllium and (b) a di-, tri- or tetrahalide of a group IV metal such as titanium, silicon, thorium, zirconium, tin, lead, hafnium, germanium, or cerium.

Suitable diluents for use in the polymerization process are paraffins, cycloparaffins and/or aromatic hydrocarbons which are relatively inert, non-deleterious and liquid under the reaction conditions of the process. The lower molecular weight paraffins, such as propane, butane, and pentane are especially useful when the process is carried out at low temperatures. However, the higher molecular weight paraffins and cycloparaffins such as isooctane, cyclohexane, methylcyclohexane and aromatic diluents such as benzene, toluene and the like, as well as mixtures of these diluents can also be used. Reactor residence time can vary widely, for example, from 1 second to 1 hour or more for continuous reactions.

Since the hydrocarbon, such as a conjugated diene, contains impurities detrimental to the subsequent process, these impurities, including water, must be removed prior to introduction of said hydrocarbon into said process. These impurities, including moisture, are conventionally removed in a plurality of contact zones containing solid adsorbent in which the hydrocarbon is continuously passed through at least one of said contact zones to be dehydrated. The adsorbent ultimately becomes incapable of further dehydration of said gas to the desired water content which necessitates passing the gas to another contact zone which is capable of dehydration. Meanwhile, the spent adsorbent is regenerated or reactivated to render it capable of further dehydration.

In accordance with this invention a novel method has been found to regenerate the spent adsorbent with the same diluent throughout the regeneration process including the steps of flushing, regeneration and cooling. In another aspect of this invention the same diluent is used to regenerate the adsorbent used for dehydrating said diluent.

In a preferred embodiment wherein an adsorbent bed is used to dehydrate a conjugated diene subsequently polymerized in the presence of a catalyst and an inert liquid hydrocarbon diluent selected from the group consisting of paraffins, cycloparaffins, aromatics and mixtures thereof, the process of this invention comprises the removal of residual conjugated diene by contacting the adsorbent bed with the diluent used in the polymerization process, thereafter reactivating and regenerating said adsorbent bed by contacting said bed with said diluent in a superheated and vaporized state and thereafter cooling said bed to a temperature suitable for dehydration of the conjugated diene by contacting said bed with said liquid diluent.

To provide the greatest adsorptive capacity during dehydration, the temperature of the inlet gases and the drying bed would be kept as low as possible, preferably within the range of 32 to 150° F. Higher temperatures may be used, but the efficiency and extent of dehydration is impaired due to the increased vapor pressure of water in the desiccant with increasing temperature. The temperature of regeneration depends on the desiccant but preferably ranges from about 250° F. to about 600° F. The preferred range is 400 to 600° F. when using materials such as bauxite and silica gel, although lower temperatures may be used with certain synthetic aluminas.

Although this invention is herein described with particular reference to the regeneration of the bed by the removal of moisture adsorbed therein, it is to be noted that the process of this invention also removes many other materials which have tended to inactivate the adsorbent and which, if they had not been removed by the desiccant, may have proven detrimental to the process in which the material being dehydrated is ultimately used.

To more fully describe this invention reference is now made to the drawing.

In discussing the process in connection with the drawing reference is made to specific materials and reaction conditions for purposes of simplicity. It should be understood, however, that our invention is not limited in this fashion.

In the drawing, reference numerals 6 and 14 signify butadiene dryers comprising dryer 14 which is in the on stream cycle whereas dryer 6 is in the regeneration cycle. It is to be understood, however, that one skilled in the art will recognize that in a normal commercial operation a battery of dryers would be operatively connected so that a number of dryers would be on stream, i.e., drying the butadiene, while a number of dryers are being regenerated by the process of this invention. For simplicity the regeneration system has been shown in the drawing as being limited to butadiene dryer 6 whereas butadiene dryer 14 functions only as a dryer on stream. However, it is to be understood that it is within the skill of the art to provide the necessary piping, pumps, furnace, separators, condensers and other apparatus to duplicate the regeneration system or to use a portion of the existing regenerating system to permit the regeneration of dryer 14 while dryer 6 is on stream.

Prior to the regeneration step to be described, butadiene containing moisture and other impurities is introduced into the system through conduits 1 and 2, valve 3, conduits 19, 4 and 5 into dryer 6 wherein moisture is removed by the alumina bed contained therein with said butadiene passing upwardly through said bed, out of the dryer 6, through conduits 7, 43, 8, 9, valve 10, and conduit 11 to be ultimately used in the process comprising the polymerization of said dehydrated butadiene in the presence of a catalyst and liquid toluene. After a period of operation the alumina beds become substantially inactive because of their inability to reduce the moisture content of the butadiene to the desired level and the bed must then be regenerated. Valves 12 and 16 are then opened and valves 3 and 10 are closed thereby permitting the passage of the butadiene through conduit 1, valve 12, conduit 13, dryer 14 containing an alumina bed identical to that contained in dryer 6. As in dryer 6, the butadiene passes upwardly through the dryer and out through conduit 15, valve 16, and conduit 11 to be used as feed stock to the reactors. This permits the regeneration of dryer 6. In the first step of the regeneration process of this invention it is necessary to remove substantially all the residual butadiene remaining in the dryer so as to prevent polymerization of the butadiene during the regeneration step which would, of course, decrease the efficiency of the adsorbent. The conventional practice has been to flush this butadiene from the dryer by passing upwardly therethrough a gaseous material such as sweet gas. Applicants have discovered that the use of a liquid hydrocarbon diluent inert to butadiene, such as toluene, for this flushing step provides substantially complete displacement of the butadiene remaining in the alumina bed thereby extending the life of the adsorbent. The particular inert liquid hydrocarbon diluent used in this step, as well as the remaining steps of this invention, depends on the polymerizable hydrocarbon being dehydrated. In a preferred embodiment, the diluent used in the regeneration steps is the same diluent used in the polymerization of the material being dehydrated. One advantage of using the same diluent is the elimination of the possibility of introducing catalyst poisons and other materials foreign to the polymerization process to the bed. This is particularly true when the regenerative material is a variable quality material, such as sweet gas. For the flushing step raw toluene is introduced to the regeneration system through conduit 17, valve 18, conduits 20, 4 and 5, and dryer 6, where it is passed upwardly through the alumina bed and out through conduits 7, 43, 8, 21, valve 22, and conduit 23. The spent raw toluene is then reclaimed, wasted, used in the polymerization step, dried to be used in the last step of this process or otherwise utilized. After raw toluene has passed through the bed for sufficient period of time to remove substantially all the butadiene remaining in dryer 6, valves 18 and 22 are closed. Preferably, the raw toluene remaining in dryer 6 is then removed from the dryer prior to the regeneration step by pressuring with an inert gas, such as nitrogen, introduced into the dryer 6 through conduit 40, valve 41, and conduits 42 and 7. The toluene is removed through conduits 5 and 44, valve 45, conduit 55, valve 56 and conduit 57 to wet diluent storage. Valves 41 and 56 are then closed and the alumina bed is ready for regeneration. This is accomplished by the process of this invention by the use of the same diluent used in the prior flushing step and the subsequent cooling step. Toluene is introduced into the regeneration system through conduit 24, valve 25, and conduit 26 into a separator and surge tank 27. The purpose of this tank 27 is to permit the separation of the toluene into phases comprising water and saturated toluene. The lower layer comprising water is removed through leg 28 and conduit 29. The raw toluene is withdrawn from separator 27 through conduit 30, propelled by pump 31 through conduits 32 and 34 into the regeneration furnace 36. Conduit 33 permits the purging of the system periodically. In the regeneration furnace 36 the liquid toluene is heated in coils 35 by any suitable means not shown to a vaporized state. The temperature and pressure are chosen so as to best remove the desired quantity of water and other impurities from the adsorbent surfaces. In general, this will be a superheated vapor. This superheated vapor is removed from furnace 36 through conduit 37, valve 38, and conduits 39, 43 and 7 to pass downwardly through dryer 6 to desorb moisture from the alumina bed. The hot vapors continue through dryer 6, conduits 5, 44, valve 45, conduit 46 and into condenser 47 where they are liquefied. The liquids comprising toluene and water are then conveyed through conduit 48 to separator 27 wherein the water is separated and removed as hereinbefore described. The regeneration step is continued until the moisture content of the dryer adsorbent has been reduced to the desired level. Since the hot vapors elevate the temperature of the bed, it is then necessary to reduce the temperature of the alumina bed to a temperature sufficiently low to permit satisfactory dehydration of the material being dehydrated. In the case of alumina the preferred temperature is about 100° F. at 60 p.s.i.a. The cooling step is accomplished by the passage of the same diluent used in the heretofore described flushing and regeneration steps of the regeneration cycle.

However, it is important that this diluent be dehydrated prior to introducing same into the dryer beds so as not to undo what the regeneration step has done. The cooling step is accomplished by closing valves 38 and 45 and introducing dry liquid toluene to the dryer through conduit 49, valve 50, conduits 51, 4 and 5 where they pass upwardly through dryer 6 so as to cool the alumina bed to a temperature suitable for dehydration of the butadiene. The dry liquid toluene then passes out of the dryer 6 through conduits 7, 43, 8, 52A, valve 53, and conduit 54 to solvent storage or other usage. When the bed has reached the desired temperature the flow of toluene through the bed is terminated. Preferably, the residual liquid toluene is then pressured from the bed by dry nitrogen introduced into the bed through conduits 40, valve 41, conduits 42 and 7. This dry toluene is removed through conduits 5 and 44, valve 45, conduit 55, valve 56 and conduit 57 for further usage. Dryer 6 is now ready to go back on stream to dry butadiene.

The use of a liquid coolant is preferred in the particular process described since dryer beds can be more readily and uniformly cooled with a liquid than a gas which permits the thorough saturation of the pellets of adsorbent. The toluene is vaporized thus making it possible to utilize its latent heat for cooling. Further, the use of a material not foreign to the process decreases the possibility of bed contamination.

It is, of course, also necessary that the toluene subsequently used as a feed to the polymerization reactors also be treated in dryed beds similar to those used for dehydrating butadiene. By the process of this invention the toluene dryers are treated in a manner similar to that used for the butadiene regeneration except that the flushing step is not necessary. This regeneration of the toluene dryers is an adjunct of the process for regenerating the butadiene dryers.

As illustrated in the drawing the toluene feed stream enters the system from a source not shown through conduits 58, 59, valve 60, conduits 61, 62 into toluene dryer 63 which contains an alumina bed similar to that contained in butadiene dryers 6 and 14. As described hereinbefore for the butadiene dryers there will normally be a series of toluene dryer beds interconnected by suitable piping and pumping to permit one or more of the beds to be on stream while the remaining beds are being regenerated. For purposes of simplification, the toluene dryers are represented herein as being on stream or on regeneration and it is within the skill of the art to provide the necessary auxiliary equipment. The feed toluene then passes upwardly through dryer 63 through conduits 64, 65, 66 and 67 through valve 68 into conduit 69 from which the toluene is used as a feed to the polymerization reactors (not shown). After the dryer 63 has been used for a period of time the alumina becomes deactivated for the dehydration of the toluene and must be regenerated. The first step in the regeneration is to terminate the supply of toluene feed to the dryer. This is done by closing valves 60 and 68. Valves 70 and 74 are then opened so that the toluene feed stream proceeds from conduit 58 through valve 70 and conduit 71 into dryer 72 from which it passes upwardly through conduit 73 and valve 74 into conduit 69. Regeneration of dryer 63 is then begun by opening valves 76 and 79 so that the toluene in dryer 63 can be removed to wet solvent storage (not shown). As described hereinbefore, toluene is superheated in regeneration furnace 36 and the superheated vapors pass through conduits 37 and 75, valve 76, conduits 77, 65 and 64 downwardly into dryer 63 to regenerate the dryer as hereinbefore described. The vapors then continue downwardly through conduits 62, 78, valve 79 and conduit 80 to enter the regeneration system through conduit 46 for recycling a sufficient number of times to reactivate the alumina bed. It is frequently advisable to utilize an inert gas, such as nitrogen, to force the toluene liquid or superheated toluene from the dryer bed by introducing an inert gas, such as nitrogen, through conduit 89, valve 87, conduits 88 and 64 into dryer 63. Since the toluene system is integral with the butadiene system it is possible that the toluene may contain trace amounts of butadiene which may build up to a significant amount in a closed system. Therefore, it is within the scope of this invention to flush the toluene dryer bed with liquid toluene to remove residual butadiene from the beds.

After the alumina has become reactivated the regeneration step is terminated by closing valves 76 and 79. The cooling step is then begun by opening valves 82 and 85 so that a portion of the dry toluene used for cooling may be diverted from conduit 49 through conduit 81, valve 82, conduits 83, 61 and 62 upwardly through dryer 63 and out through conduits 64, 65, 66, 84, valve 85, conduits 86, 52, and conduit 54. The cooling step proceeds for a period of time sufficient to cool the alumina to the temperature desired for efficient drying of the toluene.

At the end of this period the valves 82 and 85 are closed and the dryer 63 is ready to be placed back on stream.

The dehydrated toluene in conduit 69 and the dehydrated butadiene in conduit 11 is then passed to the polymerization zone wherein they are combined in a reactor in the presence of one of the catalyst systems hereinbefore described to form polybutadiene. The polybutadiene is then recovered by any suitable means.

As a specific embodiment of our invention the following specific operation is described in detail with reference to the flow as shown in the above-described drawing.

*Example*

In this specific example, it is necessary to dehydrate 1,3-butadiene which is to be polymerized with a catalyst which contains triisobutyl aluminum in combination with titanium tetrachloride and titanium tetraiodide in the presence of liquid toluene. The liquid butadiene is dehydrated in dryers which have dimensions of 20 inches by 10½ feet with 8 feet of bed length and which contain alumina. The dryers are on stream for a period of 48 hours with 24 hours being used for flushing, regeneration and cooling. The drying beds are maintained at a temperature of 100° F. and 60 p.s.i.a. while on stream. At the end of 48 hours on stream the drying bed is switched to regeneration and is first flushed as described in the drawing with raw toluene at a rate of 5 gallons per minute for 1 hour. The flush material comprising raw toluene and butadiene is then sent to wet solvent storage with nitrogen being bled into the vessel to prevent a vacuum.

The dryer bed is then maintained at a maximum temperature of 450° F. and a pressure of 60 p.s.i.a. and regenerated with superheated toluene vapor at a rate of 630 lbs. of toluene to the regeneration furnace per hour for 6 hours. After passing through the dryer bed the toluene vapor is condensed and sent to the phase separator before passing through the regeneration furnace again. After two regenerations the toluene is pumped from the phase separator to wet solvent storage. The phase separator is then refilled with toluene.

When the regeneration step is terminated, the bed is cooled with toluene at a rate of one gallon per minute for 4 hours. After condensation the material is sent to the semi-dry solvent storage tank. The aforementioned separator is maintained at 100° F. and substantially atmospheric pressure.

When the bed has been cooled to about 100° F. the flow of coolant toluene through said bed is terminated and the toluene is pressured from the bed with dry nitrogen. The dryer is now ready to go back on stream to dry butadiene.

In the aforementioned operation it is necessary to dry not only the liquid toluene being subsequently used in the polymerization process but also the toluene used for cooling in the regeneration cycle. Toluene is passed through a dryer bed containing alumina similar to that used for drying butadiene. When the bed has become inactivated by the adsorption of moisture and other impurities, the bed is regenerated by first draining substantially all of the liquid toluene remaining in the dryer and transferring same to the semi-dry solvent storage tank with nitrogen being bled into the vessel to prevent a vacuum. The dryer bed is then regenerated by passing therethrough toluene vapors superheated in the regeneration furnace at a rate of 1900 lbs. per hour for 6 hours. After passing downwardly through the dryer bed the toluene vapor is condensed and sent to the phase separator before passing through the regeneration furnace again. When the dryer bed has been reduced to the proper moisture content, the regeneration step is complete and the bed is then cooled with toluene at a rate of two gallons per minute for four hours. After condensing this dry toluene is sent to the semi-dry solvent storage tank. When the bed has been cooled to a temperature of 100° F., the flow of liquid toluene coolant is terminated. The dryer is left liquid-full of toluene and is now ready to be put on stream to dry toluene.

It can be readily seen by this example that the use of a material which is not detrimental to the conjugated diene polymerization process is a particularly desirable advantage since there are no materials introduced to the system which are detrimental to the subsequent process.

While certain examples, structures, compositions, and process steps have been described for purposes of illustration, the invention is not limited to these. Variation and modification with the scope of the disclosure and the claims can readily be effected by those skilled in the art.

What we claim is:

1. A process for regenerating an adsorbent bed deactivated by the dehydration of a conjugated diene, said conjugated diene being subsequently used in a process comprising the polymerization of said conjugated diene in the presence of an inert liquid hydrocarbon diluent selected from the group consisting of paraffins, cycloparaffins, aromatics, and mixtures thereof and a catalyst, comprising contacting said bed with said liquid diluent for a period of time sufficients to remove residual conjugated diene so as to prevent polymerization thereof during the subsequent regeneration step, thereafter contacting said bed with said diluent in a superheated and vaporized state for a period of time sufficient to reactivate said absorbent and thereafter contacting said adsorbent with said liquid diluent in a cooled and substantially dehydrated state for a period of time sufficient to cool said adsorbent to a temperature suitable for dehydration of said conjugated diene.

2. The process of claim 1 wherein said conjugated diene comprises 1,3-butadiene.

3. The process of claim 1 wherein said diluent comprises toluene.

4. The process of claim 1 wherein said adsorbent bed comprises alumina.

5. A process for regenerating an alumina bed deactivated by the dehydration of 1,3-butadiene, said 1,3-butadiene being subsequently used in a process comprising the polymerization of said 1,3-butadiene in the presence of an inert hydrocarbon diluent selected from the group consisting of paraffins, cycloparaffins, aromatics, and mixtures thereof with a catalyst which contains as an essential component a compound selected from the group consisting of organo metals and metal hydrides of groups I, II, and III metals, said process comprising passing said liquid diluent upwardly through said deactivated bed for a period of time sufficient to remove residual 1,3-butadiene so as to prevent polymerization thereof during the subsequent regeneration step, thereafter passing downwardly through said bed said diluent in a superheated and vaporized state for a period of time sufficient to reactivate said bed and thereafter passing upwardly through said bed said liquid diluent in a dehydrated and cooled state for a period of time sufficient to cool said bed to a temperature suitable for dehydration of said 1,3-butadiene.

6. The process of claim 5 wherein said diluent is toluene.

7. A process for regenerating an alumina bed deactivated by the dehydration of 1,3-butadiene, said 1,3-butadiene being subsequently used in a process comprising the polymerization of said 1,3-butadiene in the presence of toluene and a catalyst comprising triisobutyl aluminum in combination with titanium tetrachloride and titanium tetraiodide, said process comprising passing said liquid toluene upwardly through said deactivated bed for a period of time sufficient to remove residual 1,3-butadiene so as to prevent polymerization thereof during the subsequent regeneration step, terminating said diluent passage and removing residual toluene by pressuring with an inert gas, thereafter passing downwardly through said bed superheated and vaporized toluene at a temperature in the range of 250 to 600° F. for a period of time sufficient to reactivate said bed, thereafter passing upwardly through said bed substantially dehydrated toluene for a period of time sufficient to cool said bed to a temperature in the range of 32° F. to 150° F., thereafter terminating the passage of said coolant toluene and removing the residual toluene by pressuring with an inert gas.

8. A process for regenerating adsorbents comprising adsorbents deactivated by the dehydration of a hydrocarbon and adsorbents deactivated by the dehydration of a liquid hydrocarbon diluent inert to said hydrocarbon, comprising the process of contacting said former adsorbent with said diluent for a period of time sufficient to remove residual hydrocarbon so as to prevent polymerization thereof during the subsequent regeneration step, thereafter contacting said former adsorbent with said diluent in a superheated and vaporized state for a period of time sufficient to reactivate said adsorbent, thereafter contacting said former adsorbent with said liquid diluent in a cooled and substantially dehydrated state for a period of time sufficient to cool said adsorbent to a temperature suitable for the dehydration of said hydrocarbon, contacting said latter adsorbent with said diluent in a superheated and vaporized state for a period of time sufficient to reactivate said adsorbent and thereafter contacting said latter adsorbent with said liquid diluent in a cooled and substantially dehydrated state to cool said adsorbent to a temperature sufficient to dehydrate said diluent.

9. The process of claim 8 wherein said hydrocarbon comprises a conjugated diene and said diluent is selected from the group consisting of paraffins, cycloparaffins, aromatics, and mixtures thereof.

10. The process of claim 9 wherein said hydrocarbon comprises a conjugated diene.

11. The process of claim 10 wherein said diluent is toluene.

References Cited in the file of this patent

UNITED STATES PATENTS

| | | |
|---|---|---|
| 1,794,538 | Palmer et al. | Mar. 3, 1931 |
| 2,754,344 | Weatherly | July 10, 1956 |